(12) United States Patent
Chen

(10) Patent No.: US 7,886,485 B2
(45) Date of Patent: Feb. 15, 2011

(54) HORTICULTURAL WEB FOR PLANTER

(76) Inventor: Song Chen, No. 47, Lane 196, Sec. 2, Guanfu Road, Sanchung, Taipei Hsien (TW) 24158

( * ) Notice: Subject to any disclaimer, the term of this patent is extended or adjusted under 35 U.S.C. 154(b) by 594 days.

(21) Appl. No.: 12/001,882

(22) Filed: Dec. 13, 2007

(65) Prior Publication Data

US 2008/0155896 A1    Jul. 3, 2008

(30) Foreign Application Priority Data

Dec. 20, 2006    (TW) ............................... 95222423 U

(51) Int. Cl.
 *A01G 9/02* (2006.01)
(52) U.S. Cl. ...................................................... 47/66.1
(58) Field of Classification Search ............ 47/17, 47/29.4, 29.3, 29.2, 29.1, 25.1, 24.1, 31.1, 47/31, 29.6, 20.1, 66.1; 119/416, 431, 452, 119/461, 463, 474; 220/4.28, 4.33, 4.31, 220/4.01, 676
See application file for complete search history.

(56) References Cited

U.S. PATENT DOCUMENTS

| | | | | |
|---|---|---|---|---|
| 4,292,929 A | * | 10/1981 | Tellers | 119/518 |
| 4,998,506 A | * | 3/1991 | Frostad | 119/475 |
| 5,452,681 A | * | 9/1995 | Ho | 119/498 |
| 6,338,318 B1 | * | 1/2002 | Apichom | 119/497 |
| 2006/0225663 A1 | * | 10/2006 | Chiang | 119/452 |

* cited by examiner

*Primary Examiner*—Timothy D Collins
*Assistant Examiner*—Monica Williams
(74) *Attorney, Agent, or Firm*—Charles E. Baxley

(57) ABSTRACT

A planter includes a plant growing container having a chamber formed by an outer peripheral wall, a number of posts erectly disposed on the outer peripheral wall, an upper cover disposed on top of the posts and having a number of channels, and a number of door panels slidably engaged through the channels of the upper cover and engageable between the posts covering or shielding the plant growing container and for preventing diseases and insect pests from entering into the plant growing container. The door panels and the partitions and the posts may be engaged into the container for forming a compact folding structure and for storing and transportation purposes.

14 Claims, 6 Drawing Sheets

US 7,886,485 B2

HORTICULTURAL WEB FOR PLANTER

BACKGROUND OF THE INVENTION

1. Field of the Invention

The present invention relates to a planter, and more particularly to a planter including a horticultural web that include a number of parts or elements to be assembled for covering or shielding the planter and to be detached and folded to a compact folding structure.

2. Description of the Prior Art

Typical planters or planter assemblies or combinations comprise a plant growing container for receiving soil and for growing plants.

For preventing the plants from being infected with plant diseases and insect pests, an outer covering web or a horticultural web may be provided and engaged onto the plant growing container for covering or shielding the plant growing container and for preventing diseases and insect pests from entering into the plant growing container.

However, after the plants have grown up, the horticultural web may no longer be used to suitably cover or shield the plant growing container and the diseases and the insect pests may then have a good chance to enter into the plant growing container.

For some other planters or planter assemblies or combinations, a frame may be provided and attached to or disposed around the plant growing container for supporting the horticultural web. However, it may take a long time to construct the frame and to assemble the horticultural web onto the frame.

The present invention has arisen to mitigate and/or obviate the afore-described disadvantages of the conventional planters or plant growing devices.

SUMMARY OF THE INVENTION

The primary objective of the present invention is to provide a planter including a horticultural web that include a number of parts or elements to be assembled for covering or shielding the planter and to be detached and folded to a compact folding structure.

The other objective of the present invention is to provide a planter including a horticultural web having one or more door panels for being easily opened and for such as planting or watering purposes.

In accordance with one aspect of the invention, there is provided a planter comprising a plant growing container including a chamber formed by an outer peripheral wall, a number of posts erectly disposed on the outer peripheral wall, an upper cover disposed on top of the posts and including a number of channels formed in an outer peripheral portion thereof, and including a number of air perforations formed therein, and a number of door panels slidably engaged through the channels of the upper cover, and engageable between the posts, and including a number of air perforations formed therein.

The door panels each include at least one catch extended therefrom for engaging with the posts and for anchoring the door panels to the posts. The upper cover includes a number of passages formed therein and communicating with the channels of the upper cover respectively for slidably receiving the catch of the door panels.

The posts each include at least one anchor fin extended therefrom for engaging with the door panels and for anchoring the door panels to the posts. The upper cover includes a number of apertures formed therein, and the posts each include a spring latch provided on top thereof for engaging with the apertures of the upper cover.

The container includes a number of orifices formed in the outer peripheral wall, and the posts each include a spring latch provided on a lower portion thereof for engaging with the orifices of the container. The container includes a number of tracks provided on top of the outer peripheral wall for engaging with the door panels and for anchoring the door panels to the container.

The door panels each include a hand grip extended therefrom for allowing the door panels to be pulled relative to the upper cover. The container includes at least one partition disposed therein for separating the chamber of the container into a lower space and an upper space.

The container includes an inner peripheral shoulder formed therein for engaging with the partition. The partition includes a number of casings extended downwardly therefrom each having a compartment formed therein.

The container includes at least one draining hole formed in a lower portion thereof for water draining purposes. The container includes at least one plug for selectively plugging the draining hole of the container.

The upper cover includes a socket opening formed therein, and an electric socket engaged in the socket opening of the upper cover for attaching a light device. The upper cover includes at least one reinforcing rib for reinforcing the upper cover. The door panels each may also include at least one reinforcing rib for reinforcing the door panels.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
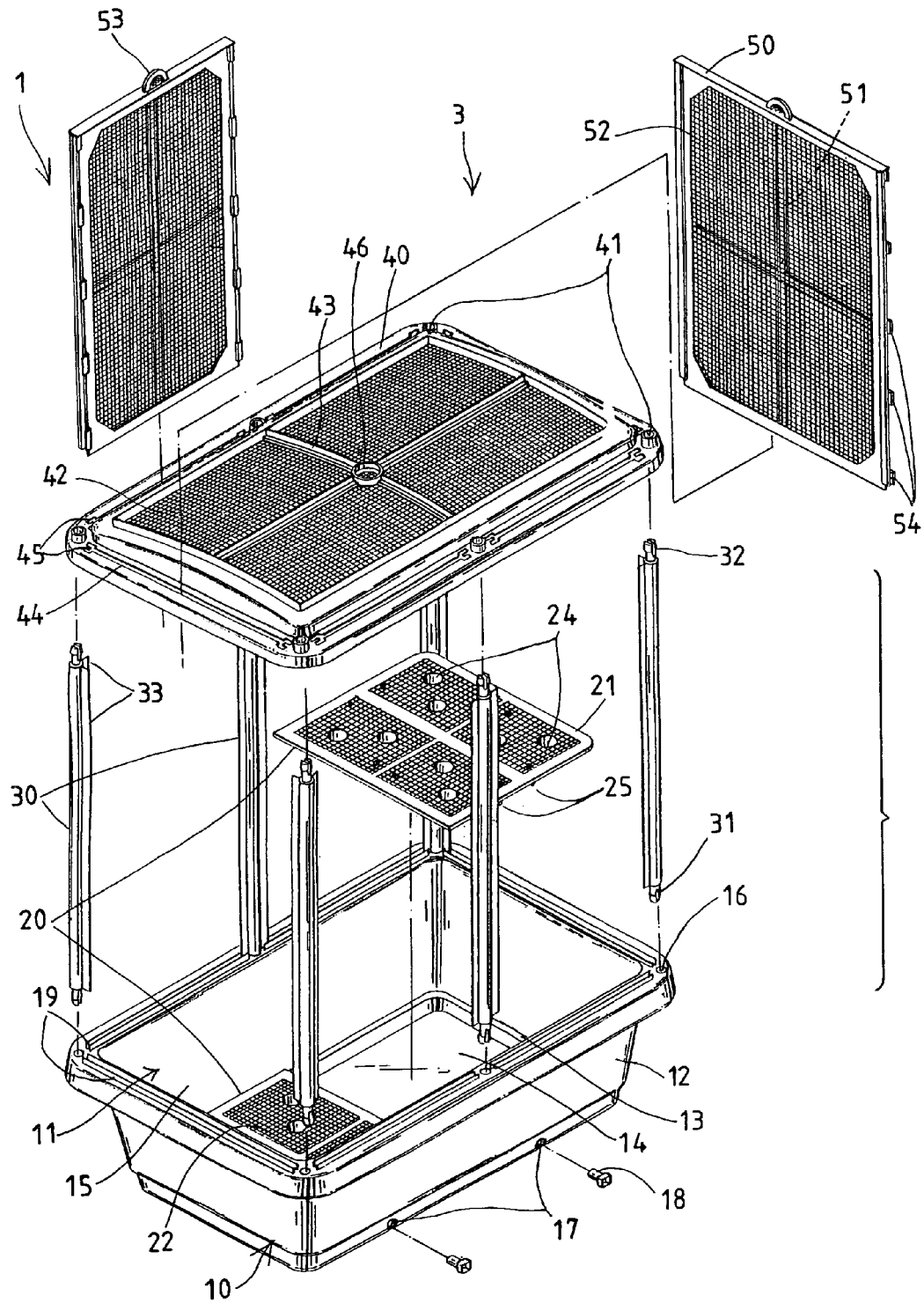
FIG. 1 is a partial exploded view of a planter in accordance with the present invention.
Figure 2:
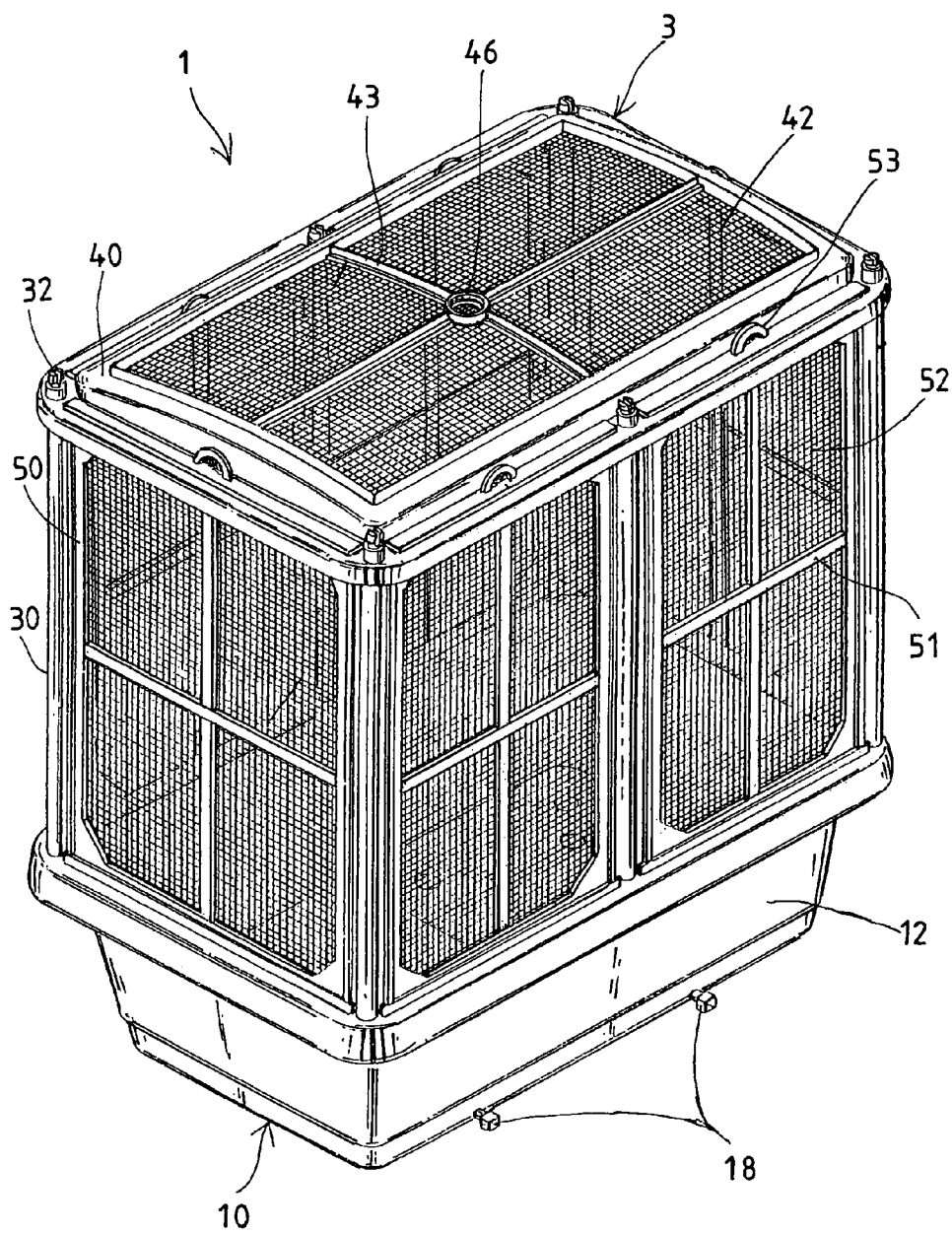
FIG. 2 is a perspective view of the planter.
Figure 3:
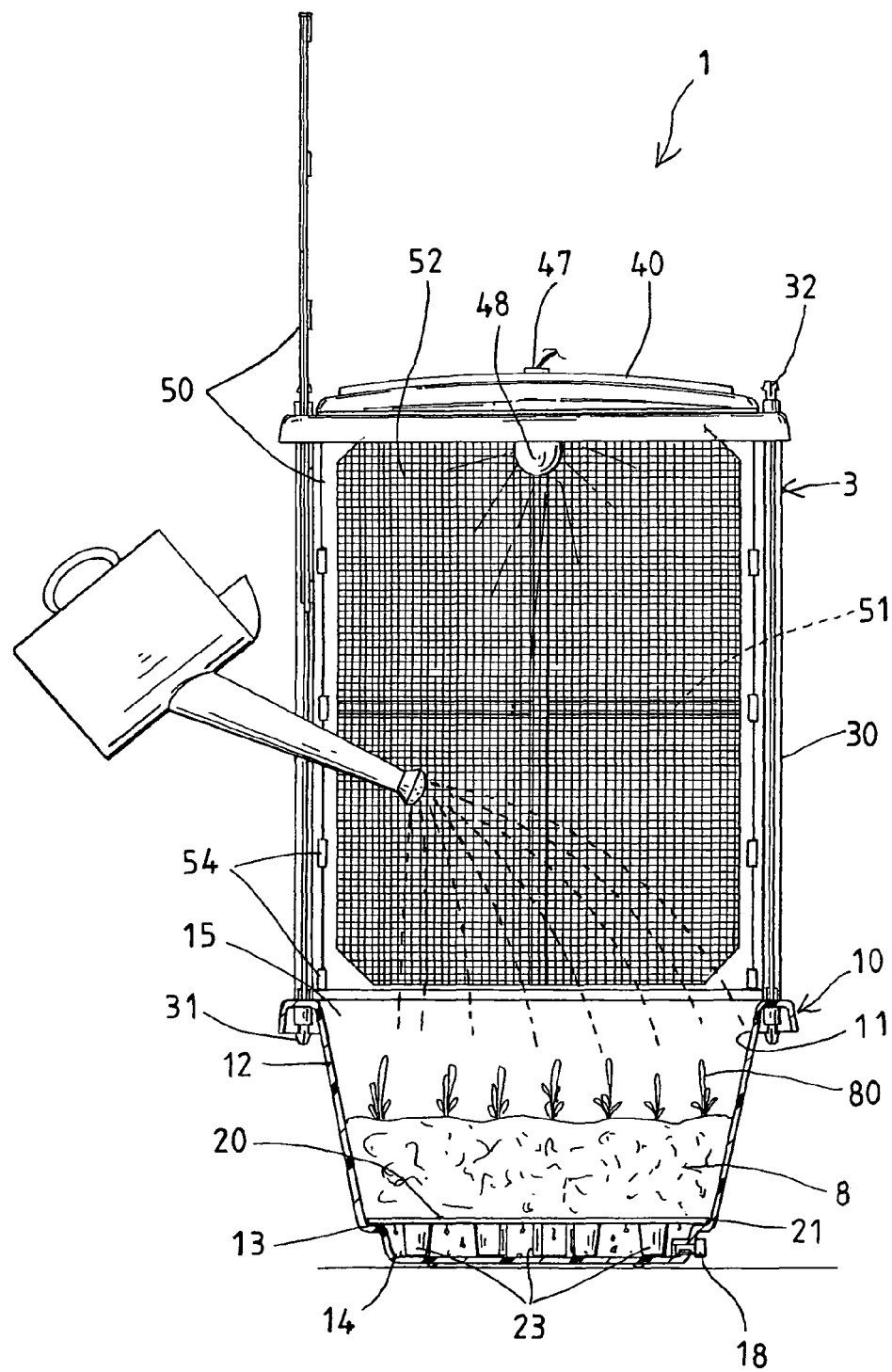
FIG. 3 is a partial side cross sectional view of the planter, illustrating the operation of the planter.
Figure 4:
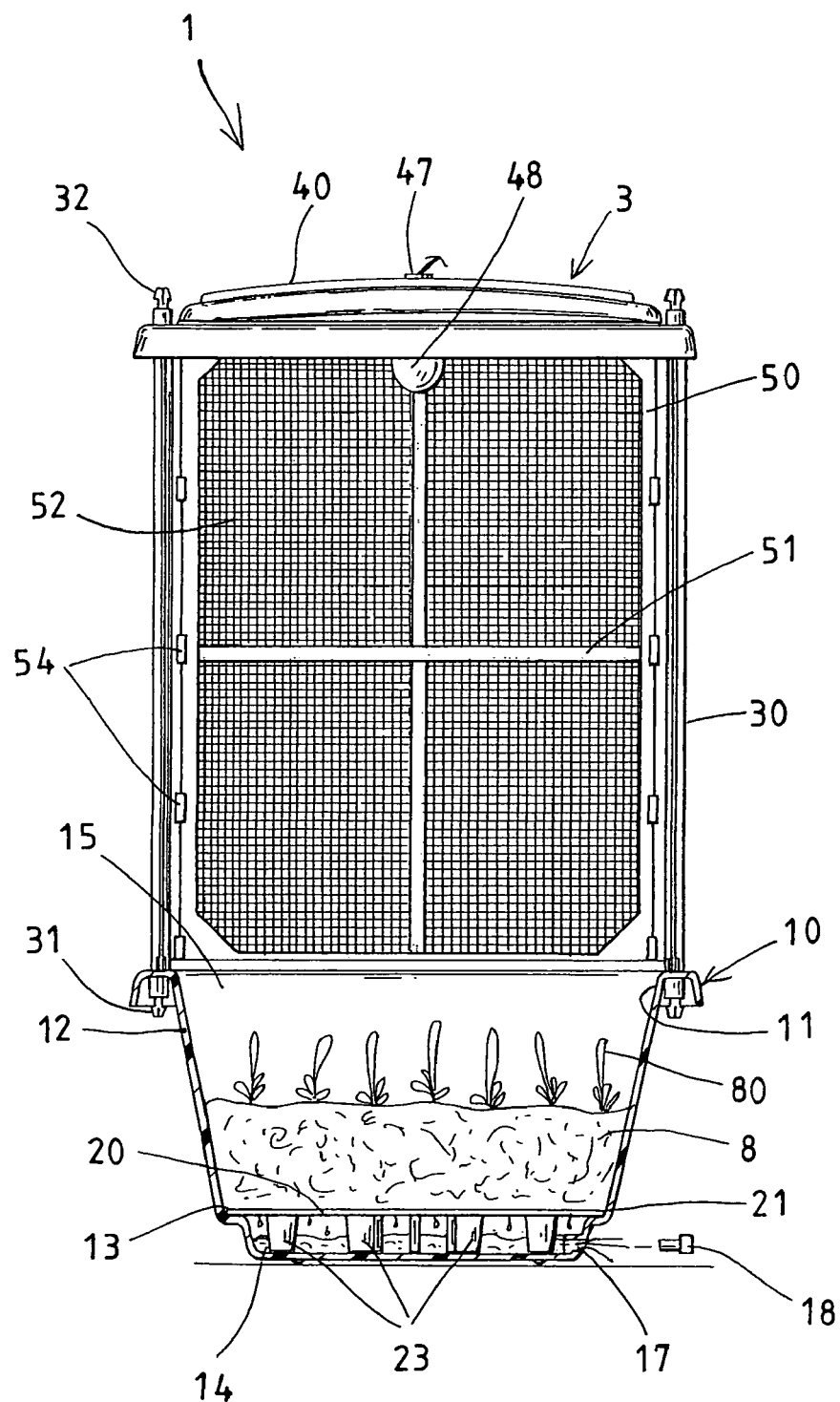
FIG. 4 is a partial side cross sectional view similar to FIG. 3, illustrating the operation of the planter.
Figure 5:
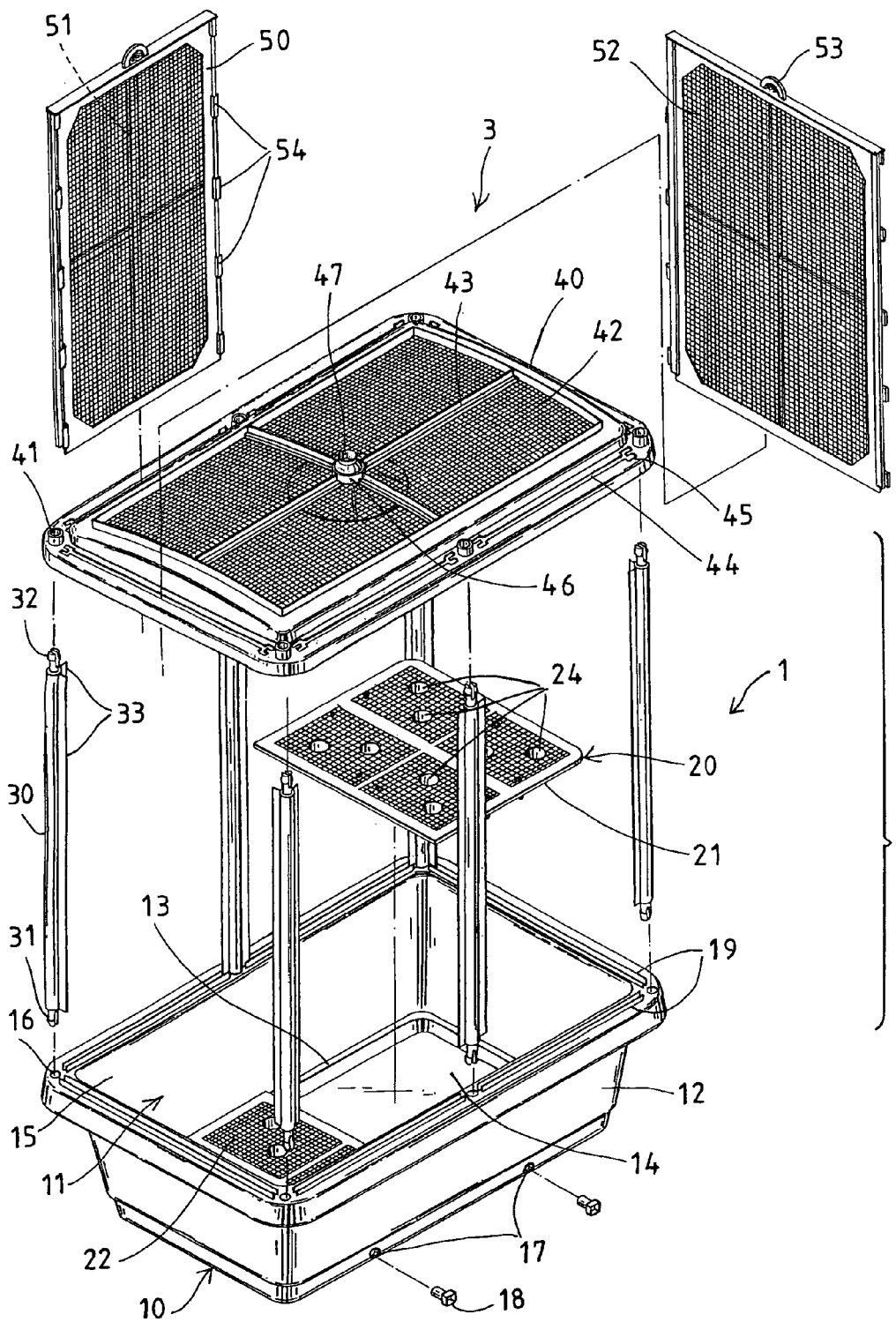
FIG. 5 is another partial exploded view illustrating the other arrangement of the planter.
Figure 6:
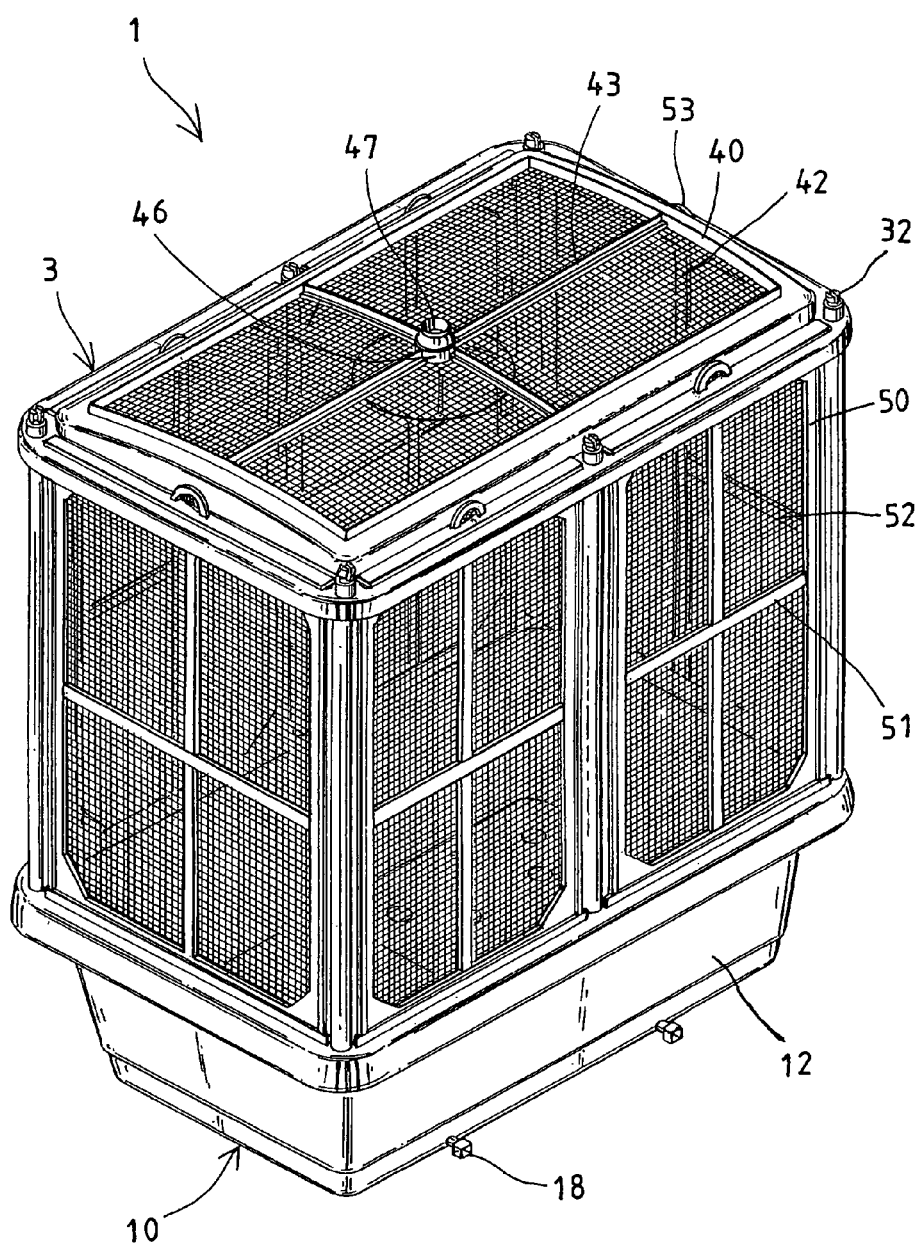
FIG. 6 is a perspective view of the planter as shown in FIG. 5.

Referring to the drawings, and initially to FIGS. 1-3, a planter 1 in accordance with the present invention comprises a plant growing container 10 including a chamber 11 formed therein and defined by an outer peripheral wall 12, and including an inner peripheral shoulder 13 formed in the inner peripheral portion thereof for forming or defining a lower space 14 below the inner peripheral shoulder 13 and an upper space 15 above the inner peripheral shoulder 13, and including one or more (such as four or six) orifices 16 formed in the upper peripheral portion of the outer peripheral wall 12, and including one or more (such as two) draining holes 17 (FIGS. 1, 4) formed in the lower peripheral portion thereof for water draining purposes, and including one or more plugs 18 for engaging with and for selectively plugging the draining holes 17 (FIGS. 2, 3), and including one or more tracks 19 formed or provided on top of the outer peripheral wall 12 (FIG. 1).

One or more floors or partitions 20 include an outer peripheral zone 21 seated or supported or engaged with the inner peripheral shoulder 13 of the plant growing container 10 in order to be supported between the lower space 14 and the upper space 15 of the plant growing container 10, and for supporting the soil 8 and the plants 80, and the partitions 20 each include a number of perforations 22 for water draining purposes, and each include one or more casings 23 extended downwardly therefrom (FIGS. 3, 4) and extended downwardly into the lower space 14 of the plant growing container 10, and each having a compartment 24 formed therein (FIG. 1) for such as water storing purposes. The partitions 20 each may further include one or more legs 25 extended downwardly therefrom (FIG. 1) for engaging with the plant growing container 10 and for further stably supporting the partitions 20 and the soil 8 and the plants 80.

A horticultural web combination or assembly 3 is to be supported on the plant growing container 10 for covering or shielding the plant growing container 10 and for preventing diseases and insect pests from entering into the plant growing container, and includes one or more (such as four or six) posts 30 each having a spring lock or latch 31 formed or provided on the lower portion thereof for engaging into the corresponding orifices 16 of the plant growing container 10, and for detachably and vertically or erectly attaching or securing the posts 30 on top of the plant growing container 10, and the posts 30 each further include another spring lock or latch 32 formed or provided on the upper portion thereof, and each include one or more (such as two) anchor fins 33 laterally and outwardly extended therefrom. An upper cover 40 includes one or more (such as four or six) apertures 41 formed in the outer peripheral portion thereof (FIG. 1) for engaging with the spring latches 32 of the posts 30 and for detachably attaching or securing the upper cover 40 on top of the posts 30, and includes a number of air perforations 42 formed therein for air flowing purposes and for allowing the sun shine to partially shine on the plants 80 and for preventing diseases and insect pests from entering into the plant growing container 10.

It is preferable that the upper cover 40 includes one or more reinforcing ribs 43 formed therein for reinforcing the upper cover 40 and for preventing the upper cover 40 from bending, and includes one or more (such as four or six) channels 44 formed therein, such as formed in the outer peripheral portion thereof (FIG. 1) for slidably receiving or engaging with door panels 50 and for allowing the door panels 50 to be engaged through the channels 44 of the upper cover 40 and to be engaged into the spaces between the posts 30, and includes a C or U-shaped passage 45 formed and located in each of the end portions of the channels 44 and communicating with the channels 44 of the upper cover 40 and aligned with the anchor fins 33 of the posts 30 respectively, and includes a socket opening 46 formed in the middle portion thereof for receiving an electric socket 47 (FIGS. 3-6) and for attaching one or more light devices 48 to the electric socket 47.

The door panels 50 each also include one or more reinforcing ribs 51 formed therein for reinforcing the door panels 50 and for preventing the door panels 50 from bending, and each also include a number of air perforations 52 formed therein for air flowing purposes and for allowing the sun shine to partially shine on the plants 80, and each include an ear or hand grip 53 extended upwardly therefrom for allowing the door panels 50 to be pulled upwardly relative to the upper cover 40 and thus for allowing the horticultural web combination or assembly 3 to be suitably opened (FIG. 3) for such as planting or watering purposes. The door panels 50 each further include one or more ears or catches 54 extended from each of the side portions thereof for engaging through the passage 45 of the upper cover 40 and for allowing the door panels 50 to be engaged through the channels 44 of the upper cover 40 and to be engaged into the spaces between the posts 30.

In operation, the door panels 50 may be engaged with the anchor fins 33 of the posts 30 and/or the tracks 19 of the plant growing container 10, or relatively, the anchor fins 33 of the posts 30 and/or the tracks 19 of the plant growing container 10 may be engaged with the door panels 50 for anchoring the door panels 50 to the posts 30 and/or the plant growing container 10 and for preventing the door panels 50 from being disengaged from the posts 30 and/or the plant growing container 10. In addition, the catches 54 of the door panels 50 may further be engaged with the anchor fins 33 or the posts 30 for further stably anchoring the door panels 50 to the posts 30 and for further preventing the door panels 50 from being disengaged from the posts 30 and/or the plant growing container 10.

After use or before shipping, the partitions 20 and the posts 30 and the door panels 50 may be disengaged or dismounted from the plant growing container 10 and may be engaged into the plant growing container 10 for forming a compact folding structure and for allowing the planter 1 to be easily carried or stored, and for allowing the planter 1 to be excellent for transportation and storing purposes.

Accordingly, the planter in accordance with the present invention includes a horticultural web having a number of parts or elements to be assembled for covering or shielding the planter and to be detached and folded to a compact folding structure, and having one or more door panels for being easily opened and for such as planting or watering purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A planter comprising:
a plant growing container including a chamber formed by an outer peripheral wall,
a plurality of posts erectly disposed on said outer peripheral wall,
an upper cover disposed on top of said posts and including a plurality of channels formed in an outer peripheral portion thereof, and including a plurality of air perforations formed therein, and
a plurality of door panels slidably engaged through said channels of said upper cover, and engageable between said posts, and including a plurality of air perforations formed therein, said door panels each including at least one catch extended therefrom for engaging with said posts and for anchoring said door panels to said posts, and
said upper cover including a plurality of passages formed therein and communicating with said channels of said upper cover respectively for slidably receiving said at least one catch of said door panels.

2. The planter as claimed in claim 1, wherein said posts each include at least one anchor fin extended therefrom for engaging with said door panels and for anchoring said door panels to said posts.

3. The planter as claimed in claim 1, wherein said upper cover includes a plurality of apertures formed therein, and said posts each include a spring latch provided on top thereof for engaging with said apertures of said upper cover.

4. The planter as claimed in claim 1, wherein said container includes a plurality of orifices formed in said outer peripheral wall, and said posts each include a spring latch provided on a lower portion thereof for engaging with said orifices of said container.

5. The planter as claimed in claim 1, wherein said container includes a plurality of tracks provided on top of said outer peripheral wall for engaging with said door panels and for anchoring said door panels to said container.

6. The planter as claimed in claim 1, wherein said door panels each include a hand grip extended therefrom for allowing said door panels to be pulled relative to said upper cover.

7. The planter as claimed in claim 1, wherein said container includes at least one partition disposed therein for separating said chamber of said container into a lower space and an upper space.

8. The planter as claimed in claim 7, wherein said container includes an inner peripheral shoulder formed therein for engaging with said at least one partition.

9. The planter as claimed in claim 7, wherein said at least one partition includes a plurality of casings extended downwardly therefrom each having a compartment formed therein.

10. The planter as claimed in claim 1, wherein said container includes at least one draining hole formed in a lower portion thereof for water draining purposes.

11. The planter as claimed in claim 10, wherein said container includes at least one plug for selectively plugging said at least one draining hole of said container.

12. The planter as claimed in claim 1, wherein said upper cover includes a socket opening formed therein, and an electric socket engaged in said socket opening of said upper cover for attaching a light device.

13. The planter as claimed in claim 1, wherein said upper cover includes at least one reinforcing rib for reinforcing said upper cover.

14. The planter as claimed in claim 1, wherein said door panels each include at least one reinforcing rib for reinforcing said door panels.

* * * * *